Patented Nov. 28, 1922.

1,436,856

UNITED STATES PATENT OFFICE.

GEORGE W. BRENIZER AND CHARLES C. HUTSON, OF RICHMOND, INDIANA.

PRINTING PROCESS INK.

No Drawing.   Application filed January 31, 1922.   Serial No. 533,060.

*To all whom it may concern:*

Be it known that we, GEORGE W. BRENIZER and CHARLES C. HUTSON, both citizens of the United States, residing in the city of Richmond, in the county of Wayne, State of Indiana, have invented a new, novel, and useful Printing Process Ink, of which the following is a full, clear, and comprehensive specification and exposition, being such as will enable others to make and use the same with absolute exactitude.

The object of this invention is to provide an ink or other chemical composition which is adapted to be used in connection with various printing processes, such for instance as that covered by Letters Patent No. 1,402,935, dated January 10, 1922; also as that set forth in an application for patent by us filed in the Patent Office January 31, 1922, Serial No. 533,004.

More particularly stated our object is to provide a chemical composition of simple and inexpensive ingredients with which any desired design or configuration may be drawn and which, after it becomes dry, has the quality of abnormally expanding or rising when it is heated, that is when considerable heat is applied thereto, such as molten type metal or the like.

The ink is first prepared in powder form, and it comprises yellow dextrine, sodium bicarbonate, and pigment. The pigment above mentioned is simply a coloring matter, preferably rose pink in color.

We have found by actual practice that approximately the following proportions gives the most satisfactory results:

Yellow dextrine ten parts; sodium bicarbonate one part; and pigment one-half of one part, all by measure.

All of the above mentioned ingredients are to be thoroughly mixed together, after which the composition may be put up in packages of any convenient size to meet various conditions.

When required for use the desired amount of the powder is to be mixed with water until it is of the proper consistency, which should be about that of ordinary paint or somewhat thicker than writing ink.

The composition as above constituted is applied with a brush or pen or by any other means desired by the artist.

The composition is to be applied upon card-board or the like, with which it forms a matrix, for the purpose hereinafter stated.

The composition may be applied in one or more applications or coats, the greater number of applications will of course finally produce deeper intaglios in the metal plate made thereby.

Also, if one desires, he may make an application of the ink and then before it becomes dry he may sprinkle on the design made thereby a quantity of the dry composition. This not only acts as a drier, but it also will increase the body of the ink applied, giving results similar to a plurality of applications of the ink. After the damp design has absorbed all of the powder possible then the surplus powder may be removed by gravity.

In practice the yellow dextrine is employed as the body element, and it also acts as an adhesive element or binder. The sodium bicarbonate is the abnormally expansible element, or that which causes the composition to enlarge or rise when heat is applied thereto. The pigment is the coloring element. And the water provides the proper moisture and also is employed to render the mixture fluid.

After a design has been formed on a cardboard or the like, and the ink applied thereto has become dry, then molten type metal may be applied thereover, which immediately causes the ink to expand, thereby forming the impressions intaglio in the face of the metal, which when the metal becomes cool will provide a stereotype plate from which printed matter may be made.

We desire that it be understood that we are not to be limited to the precise details herein set forth, or to the various elements enumerated, as these may be changed and the proportions may be varied to meet various conditions, and the invention may be otherwise employed if desired.

Having now fully shown and described our invention, what we claim and desire to secure by Letters Patent of the United States, is—

1. A printing process ink containing yellow dextrine, sodium bicarbonate, and a coloring element.

2. A printing process ink containing yellow dextrine, sodium bicarbonate, and pigment.

3. A printing process ink containing yellow dextrine, sodium bicarbonate, pigment and water.

GEORGE W. BRENIZER.
CHARLES C. HUTSON.